United States Patent
Lam et al.

(10) Patent No.: US 11,789,657 B2
(45) Date of Patent: Oct. 17, 2023

(54) DEVICES, SYSTEMS, AND METHODS FOR TRANSPARENTLY INTERCEPTING DATA STORED ON A STORAGE DEVICE AND PROVIDING SERVICES RELATED TO THE DATA

(71) Applicant: Cirrus Data Solutions Inc., Syosset, NY (US)

(72) Inventors: Wai T. Lam, Jericho, NY (US); Sammy Tam, Plainview, NY (US); Li-Hsiang Cheng, Staten Island, NY (US); Tomasz Jaworski, Northport, NY (US)

(73) Assignee: CIRRUS DATA SOLUTIONS INC., Syosset, NY (US)

( * ) Notice: Subject to any disclaimer, the term of this patent is extended or adjusted under 35 U.S.C. 154(b) by 55 days.

(21) Appl. No.: 17/508,587

(22) Filed: Oct. 22, 2021

(65) Prior Publication Data
US 2022/0129202 A1   Apr. 28, 2022

Related U.S. Application Data

(60) Provisional application No. 63/104,901, filed on Oct. 23, 2020.

(51) Int. Cl.
*G06F 3/06* (2006.01)

(52) U.S. Cl.
CPC .......... *G06F 3/0659* (2013.01); *G06F 3/0604* (2013.01); *G06F 3/0617* (2013.01); *G06F 3/0635* (2013.01); *G06F 3/0673* (2013.01)

(58) Field of Classification Search
None
See application file for complete search history.

(56) References Cited

U.S. PATENT DOCUMENTS

| | | | | |
|---|---|---|---|---|
| 7,707,151 | B1* | 4/2010 | Blumenau | G06F 11/1438 712/225 |
| 7,809,868 | B1* | 10/2010 | Mu | G06F 3/0683 710/5 |
| 9,542,324 | B1* | 1/2017 | Wehman | G06F 12/126 |
| 10,613,982 | B1* | 4/2020 | McLeran | G06F 12/0862 |

(Continued)

*Primary Examiner* — Tracy A Warren
(74) *Attorney, Agent, or Firm* — LUCAS & MERCANTI, LLP

(57) ABSTRACT

An intercept engine is installed on a computer and includes an intercept filter adapted to intercept selected commands transmitted between a file system and a storage device. The intercept engine also includes an intercept manager adapted to transmit to the intercept filter one or more primitives, wherein each primitive includes device information specifying a device, wherein a command directed to the specified device is to be intercepted, command type information specifying a type of command to be intercepted, and follow-up action information specifying an action to be performed after the command has been intercepted. A primitive may also include default action information specifying an action to be performed with respect to the command if a communication between the intercept filter and the intercept manager is interrupted. The intercept engine intercepts commands transmitted between the file system and the storage device in accordance with the one or more primitives.

15 Claims, 19 Drawing Sheets

(56) References Cited

U.S. PATENT DOCUMENTS

| | | | | |
|---|---|---|---|---|
| 2004/0221123 | A1* | 11/2004 | Lam | H04L 67/1097 |
| | | | | 711/202 |
| 2009/0300301 | A1* | 12/2009 | Vaghani | G06F 3/0665 |
| | | | | 711/E12.103 |
| 2014/0006657 | A1* | 1/2014 | Rajamanickam | G06F 3/0643 |
| | | | | 710/52 |
| 2014/0109107 | A1* | 4/2014 | Wilkinson | G06F 9/544 |
| | | | | 719/313 |
| 2016/0344810 | A1* | 11/2016 | Das | G06F 3/0617 |
| 2017/0154142 | A1* | 6/2017 | Lv | G06F 3/0664 |
| 2018/0246672 | A1* | 8/2018 | Graham | G06F 3/0659 |
| 2021/0223959 | A1* | 7/2021 | Kumar | G06F 3/0607 |

\* cited by examiner

DEVICES, SYSTEMS, AND METHODS FOR TRANSPARENTLY INTERCEPTING DATA STORED ON A STORAGE DEVICE AND PROVIDING SERVICES RELATED TO THE DATA

CROSS REFERENCE TO RELATED APPLICATION

This application claims the benefit of priority of U.S. Provisional Patent Application No. 63/104,901, filed on Oct. 23, 2020, application which is incorporated herein in its entirely for all purposes.

TECHNICAL FIELD

This specification relates generally to systems and methods for storing and managing data, and more particularly to devices, systems, and methods for transparently intercepting data stored on a storage device and providing services related to the data.

BACKGROUND

The storage of electronic data, and more generally, the management of electronic data, has become increasingly important. With the growth of the Internet, and of cloud computing in particular, the need for data storage capacity, and for methods of efficiently managing stored data, continue to increase. Many different types of storage devices and storage systems are currently used to store data, including solid state disk (SSD) drivers, magnetic disk drives, tape drives, optical disks, redundant arrays of independent disks (RAIDs), Fibre channel-based storage area networks (SANs), etc. Additionally, cloud storage providers offer various types of virtual disks in the cloud, both in block and file format.

In many enterprise-level storage systems, it is useful to add data management services to the existing storage system in order to perform one or more desired tasks. For example, it may be useful in some storage systems to add functionality to copy data, to perform a snapshot of a data image, to back up data, to replicate data, to perform data migration from one storage device or system to another, etc.

However, existing data storage systems do not allow additional services to be installed without interruption of input/output (I/O) operations. Typically, this requires downtime for applications running on the system and can be costly.

There is a need for methods, apparatus, and systems to transparently insert a virtual storage layer into a storage network without interrupting I/O operations.

SUMMARY

In accordance with an embodiment, an intercept engine includes an intercept filter adapted to intercept selected commands transmitted between a file system or other applications and a storage device. The intercept engine also includes an intercept manager adapted to transmit to the intercept filter one or more primitives, wherein each primitive includes device information specifying a device, wherein a command directed to the specified device is to be intercepted, command type information specifying a type of command to be intercepted, and follow-up action information specifying an action to be performed after the command has been intercepted. The intercept engine intercepts commands transmitted between the file system or other applications and the storage device in accordance with the one or more primitives.

In one embodiment, the primitive also includes default action information specifying an action to be performed with respect to the command if a communication between the intercept filter and the intercept manager is interrupted.

In another embodiment, the intercept engine and the file system or other applications reside and operate in a single computer.

In another embodiment, the storage device is linked to the computer.

In another embodiment, the command type information specifies a read command or a write command.

In another embodiment, the follow-up action includes an instruction to perform one of the following actions: with respect to a command transmitted from the file system or other applications to the storage device, hold the command and wait until further instruction is received from the intercept manager; with respect to a command transmitted from the file system or other applications to the storage device, notify the intercept manager and execute the command; with respect to a command transmitted from the storage device to the file system, hold the command until confirmation that the command has been performed is received from the intercept manager; or with respect to a command acknowledgement returned from the storage device to the file system or other applications, hold the command and wait until further instruction is received from the intercept manager.

In accordance with another embodiment, the intercept engine of claim 1 is installed on a computer. An application adapted to migrate selected data stored the storage device to a second storage device is installed on the computer. One or more first data blocks associated with the selected data are copied, by the application, from the storage device to the second storage device. Write commands transmitted between a file system of the computer and the storage device are intercepted by the intercept engine. For each write command intercepted: the write command is allowed by the intercept engine to be executed on the storage device, and a location of the data stored is recorded by the intercept engine in a changed data map. One or more second data blocks are copied by the application from the storage device to the second storage device, based on the changed data map.

In accordance with another embodiment, a device includes a storage device adapted to store data, a file system adapted to store data in the storage device, and an intercept filter adapted to intercept selected commands transmitted between the file system and the storage device. The device also includes an intercept manager adapted to transmit to the intercept filter one or more primitives. Each primitive includes device information specifying a device, wherein a command directed to the specified device is to be intercepted, command type information specifying a type of command to be intercepted, and follow-up action information specifying an action to be performed after the command has been intercepted.

These and other advantages of the present disclosure will be apparent to those of ordinary skill in the art by reference to the following Detailed Description and the accompanying drawings.

DETAILED DESCRIPTION

In accordance with an embodiment, a transparent intercept engine resides and operates in a computer that may include business or other application programs, a file system, data I/O (Input/Output) device drivers, and one or more storage devices. The intercept engine intercepts commands transmitted between the file system, or other applications, commonly referred to as the "upper layer" in this description, and the storage devices, possibly through various other device drivers, and hardware bus adapter. These devices drivers, hardware bus adapter, and storage devices are referred to as "lower layer" in this description. The "upper layer" and "lower layer" are from the perspective relative to the intercept engine The intercept engine includes an intercept filter adapted to intercept selected commands transmitted between the upper layer and a storage system and an intercept manager. The intercept manager is adapted to transmit to the intercept filter one or more primitives. Each primitive includes the following four items of information: device information specifying a device, wherein a command directed to the specified device is to be intercepted (or an acknowledgment associated with such a command); command type information specifying a type of command to be intercepted; follow-up action information specifying an action to be performed after the command has been intercepted; and default action information specifying an action to be performed with respect to the command if a communication between the intercept filter and the intercept manager is interrupted, referred to as the "autonomous mode".

The device information may include an identifier of a storage device, for example. The command type information may specify a read command or a write command, for example. The follow-up action may include an instruction to perform one of the following actions: with respect to a command transmitted from the upper layer to the storage system, hold the command and wait until further instruction is received from the intercept manager; with respect to a command transmitted from the upper layer to the storage system, notify the intercept manager and execute the command; with respect to a command acknowledgement returned from the storage system to the upper layer, hold the command acknowledgement returned until confirmation that the command has been processed is received from the intercept manager; or with respect to a command acknowledgement returned from the storage system to the upper layer, hold the command acknowledgement and wait until further instruction is received from the intercept manager.

Figure 1:
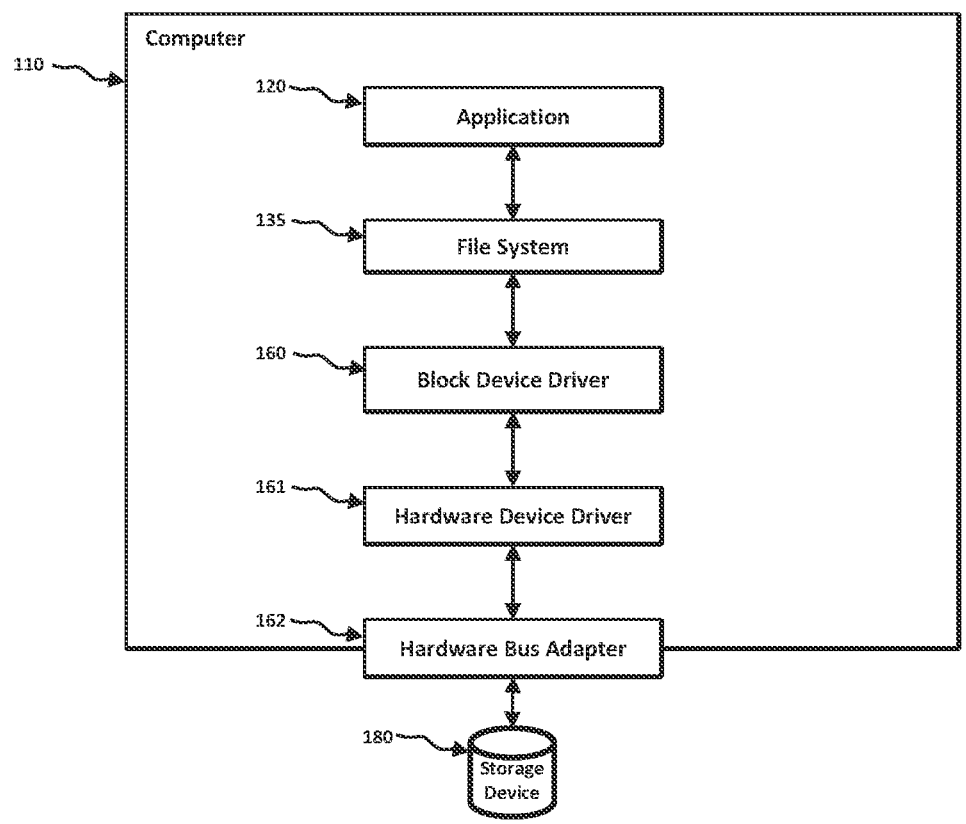
FIG. 1 shows components of an exemplary computer.

FIG. 1 shows components of an exemplary computer. Computer 110 includes application(s) 120, a file system 135, a block device driver 160, a hardware device driver 161, a hardware bus adapter 162, and a storage device 180. Computer 110 may be an application server, a personal computer (PC), a laptop device, a workstation, a cell phone, or other type of processing device. Computer 110 can also be a virtual machine where the computer is a virtual instant in a hypervisor. Therefore, hardware bus adapter 162 can also be a virtual adapter in a virtual machine.

Applications 120 include various software applications residing and operating on computer 110. Applications 120 from time-to-time access file system 135 to retrieve, store, or organize data.

File system 135 is a method and a process that manages the storage of data on storage device 180. File system 135 operates at a block level to control and manage the storage device's internal data structure and operations. File system 135 may present data to a user in the form of files and folders. File systems are known.

Block device driver 160 enables file system 135 to communicate with storage device 180, through the lower level hardware device driver 161, and the physical connection provided by the hardware bus adapter 162. For example, block device driver 160 from time to time receives a command transmitted by file system 135 to storage device 180 in standard block format, and may convert the command to a format more suitable for storage device 180. Block device driver 160 then transmits the command to storage device 180 Drivers are known.

Storage device 180 stores data. Storage device 180 may include any type of storage device, such as one or more solid state disks, one or more magnetic disks, one or more removable disks, one or more magneto-optical disks, one or more optical disks, etc., internal or external to the computer chassis, or from the network, such as fibre channel or iSCSI.

Figure 2:
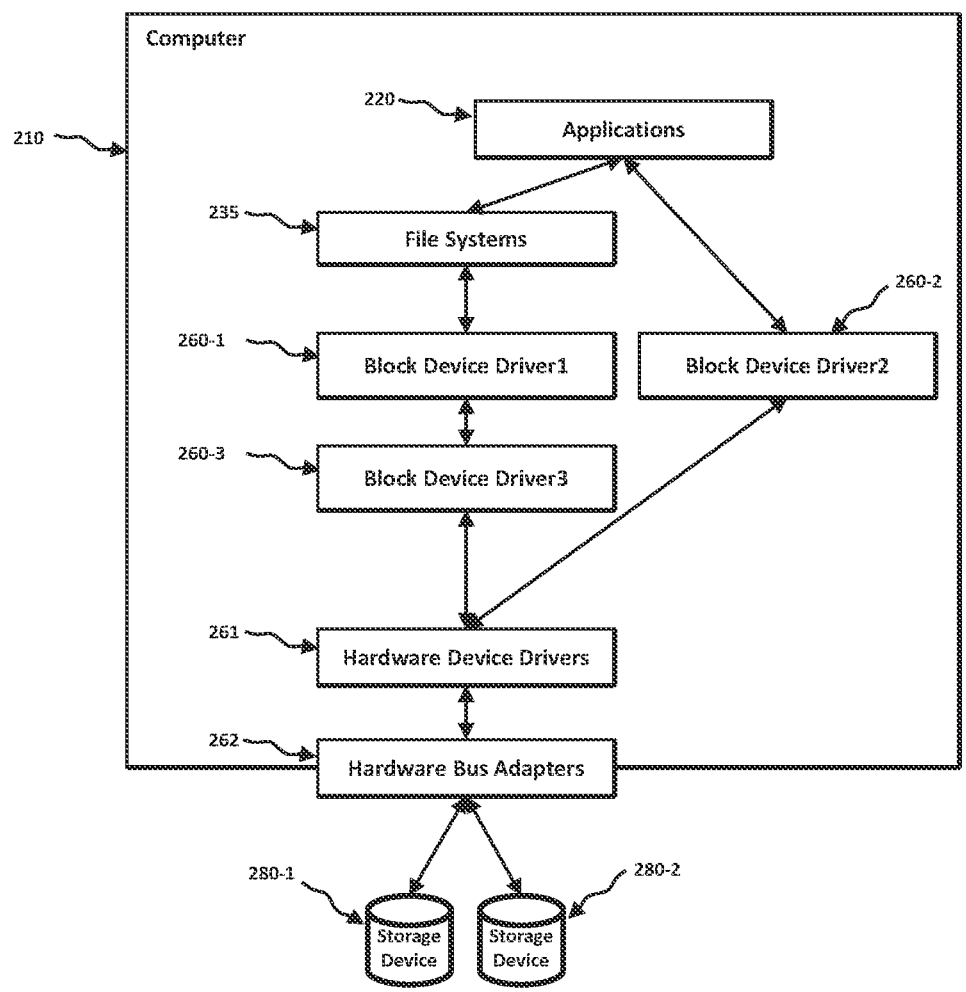
FIG. 2 shows components of an exemplary computer that includes a plurality of drivers.

A computer may include more than one block device driver. A computer may include more than one storage device. FIG. 2 shows components of an exemplary computer that includes a plurality of block device drivers and a plurality of storage devices. Computer 210 includes applications 220, a file system 235, a first storage device 280-1 and a second storage device 280-2. Computer 210 may be an application server, a personal computer (PC), a laptop device, a workstation, a cell phone, or other type of processing device. Applications 220, file system 235, and storage devices 280-1 and 280-2 are identical or similar to the corresponding components of computer 110 of FIG. 1.

Computer 210 also includes a plurality of block device drivers 260-1, 260-2, 260-3, etc. Some commands transmitted from file system 235 to storage device 280 passes through block device drivers 260-1, 260-3, hardware device driver 261, hardware bus adapter 262, before being transmitted to storage device 280. Some commands transmitted from applications 220 to storage device 280 passes through block device drivers 260-2, hardware device driver 261, hardware bus adapter 262, before being transmitted to storage device 280. Each driver performs one or more actions with respect to the command and transmits it to the next driver or to storage device 280. For example, driver 260-1 may convert the format of a command transmitted by file system 235 to a format suitable for storage device 280 (or vice versa), driver 260-2 may encode commands transmitted by file system 235 to storage device 280, etc. The existence of multiple device drivers in a computer is known.

In existing computers, drivers are often provided by the manufacturer of a storage device and installed in the computer to serve as an interface with the storage device. In other computers, a standardized driver may be provided by the manufacturer of the computer. The functionality of these existing drivers is determined by the manufacturer of the storage device, or is standardized, and cannot be easily modified to add additional functionality.

Figure 3:
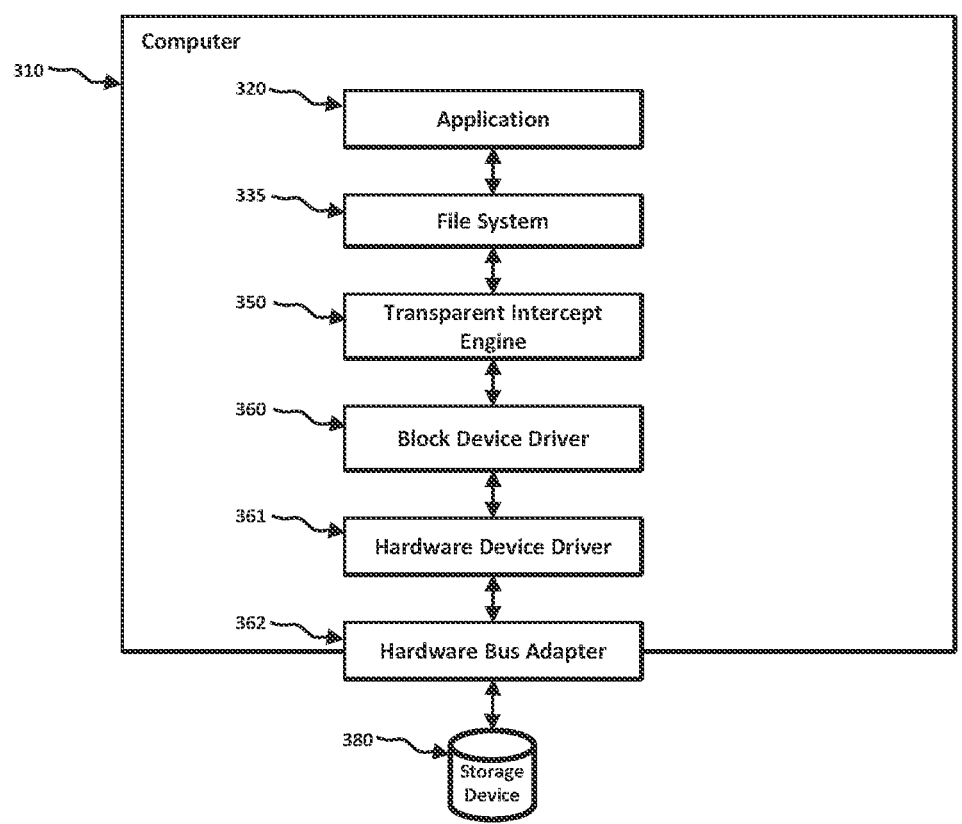
FIG. 3 shows components of a computer in accordance with an embodiment.

In accordance with an embodiment, a transparent intercept engine may be inserted in a computer and intercepts commands transmitted between upper layer and a storage device. FIG. 3 shows components of a computer in accordance with an embodiment. Computer 310 includes applications 320, a file system 335, a block device driver 360, a hardware device driver 361, a hardware bus adapter 362, and a storage device 380. Computer 310 may be an application server, a personal computer (PC), a laptop device, a workstation, a cell phone, or other type of processing device. Applications 320, file system 335, block device driver 360, hardware device driver 361, hardware bus adapter 362, and storage device 380 are identical or similar to the corresponding components of computer 110 of FIG. 1.

Figure 4A:
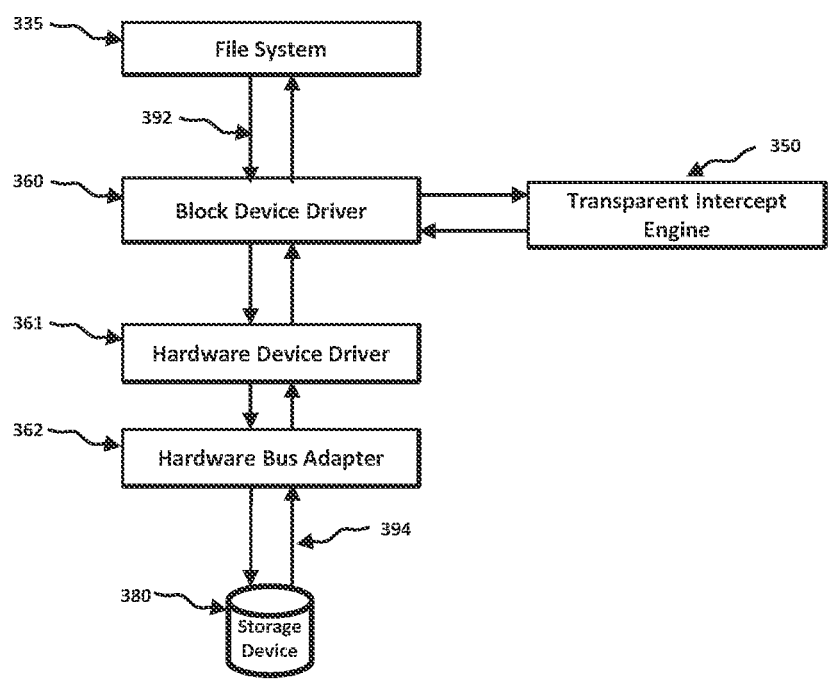
FIG. 4A shows the direction and flow of communications between a file system and a storage device in accordance with an embodiment.
Figure 4B:
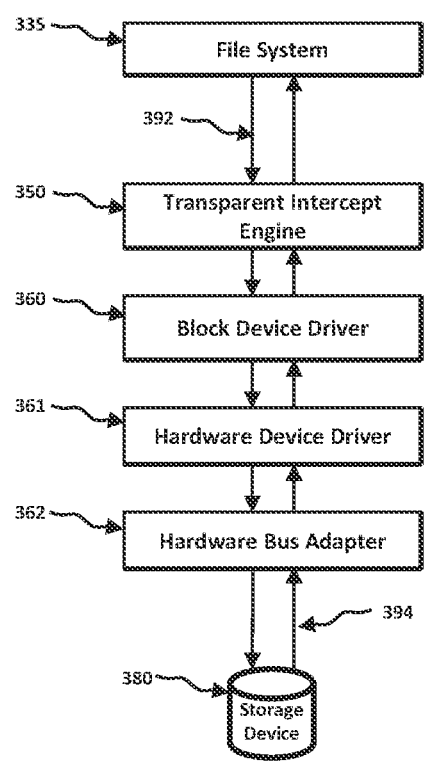
FIG. 4B shows the direction and flow of communications between a file system and a storage device in accordance with another embodiment.

Computer 310 also includes a transparent intercept engine 350. Transparent intercept engine 350 is adapted to transparently intercept communications between file system 335, or application 320 and storage device 380. Transparent intercept engine 350 may be inserted into block device driver 360, as shown in FIG. 4A. Alternatively, transparent intercept engine 350 may be inserted above the block device driver 360, as shown on FIG. 4B. FIG. 4A and FIG. 4B show the direction and flow of communications between file system 335 and storage device 380 in accordance with respective embodiments. Specifically, transparent intercept engine 350 may intercept a command 392 transmitted by file system 335 to storage device 380 inside the block device driver 360, as shown in FIG. 4A, or before the command is received by block device driver 360, as shown in FIG. 4B. Transparent intercept engine 350 may perform one or more actions with respect to the command and then transmit the command back to block device driver 360; the command then continues in the regular manner until it reaches storage device 380. Similarly, a command acknowledgement 494 returned by storage device 380 to file system 335 may be received by block device driver 360 and then transmitted by block device driver 360 to file system 335. Transparent intercept engine 350 may intercept the command acknowledgement after the command acknowledgement is returned by block device driver 360 and before the command acknowledgement is received by file system 335. Transparent intercept engine 350 may perform one or more actions with respect to the command acknowledgement and then return the command acknowledgement to file system 335.

As used herein, the term "downstream" refers to the flow of communications along the path from file system 335 to storage device 380. The term "upstream" refers to the flow of communications along the path from storage 380 to file system 335.

Advantageously, transparent intercept engine 350 is a software application separate and independent from file system 335 and block device driver 360, and may be installed in the computer and begin operating without interrupting the operation of file system 335, block device driver 360, or storage device 380. Accordingly, a user who wishes to add functionality to a computer in order to enable various operations such as caching, data backup, data migration, data deduplication, data mirroring, etc. (without interrupting the operation of the computer) may install a transparent intercept engine such as transparent intercept engine 350. The transparent intercept engine transparently intercepts communications between the upper layer and the storage device, enabling a variety of additional data storage-related operations.

Figure 5:
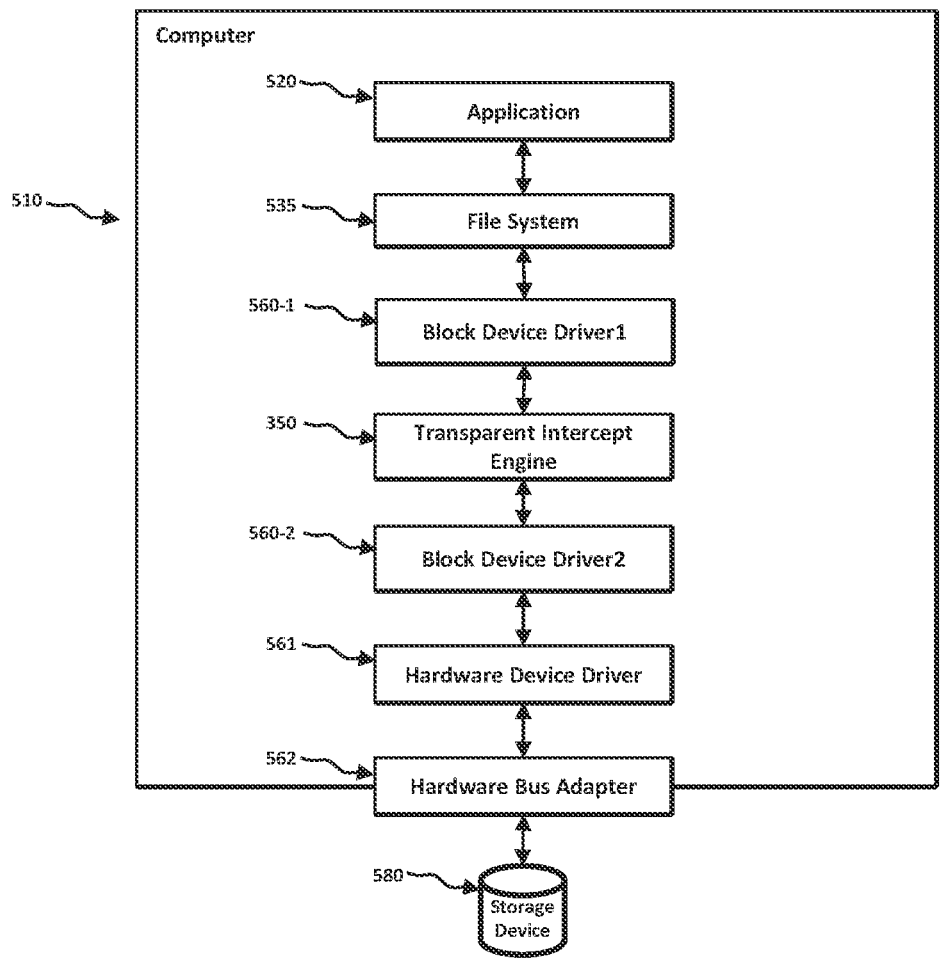
FIG. 5 shows components of a computer in accordance with another embodiment.

In accordance with an embodiment, a transparent intercept engine may be installed in a computer that includes multiple drivers. FIG. 5 shows components of a computer in accordance with another embodiment. Computer 510 includes applications 520, a file system 535, a first block device driver 560-1, a second block device driver 560-2, a hardware device driver 561, a hardware bus adapter 562, and a storage device 580. Computer 510 may be an application server, a personal computer (PC), a laptop device, a workstation, a cell phone, or other type of processing device. Applications 520, file system 535, block device drivers 560-1, 560-2, hardware device driver 561, hardware bus adapter 562, and storage device 580 are identical or similar to the corresponding components of computer 110 of FIG. 1.

In an illustrative embodiment, first block device driver 560-1 may be adapted to convert commands transmitted by file system 535 to a format suitable for storage device 580. Second block device driver 560-2 may be a driver adapted to encode all or part of various commands in order to provide additional security for data stored on storage device 580.

Computer 510 also includes a transparent intercept engine 350 adapted to intercept communications between file system 535 and storage device 580. In the embodiment of FIG. 5, transparent intercept engine 350 is adapted to intercept a command transmitted by file system 535 after the command has been transmitted by block device driver 560-1 and before it has been received by block device driver 560-2. Similarly, transparent intercept engine 350 may intercept a command acknowledgement returned by storage device 580 to file system 535 after it has been returned by block device driver 560-2 and before it has been received by driver 560-1.

Figure 6:
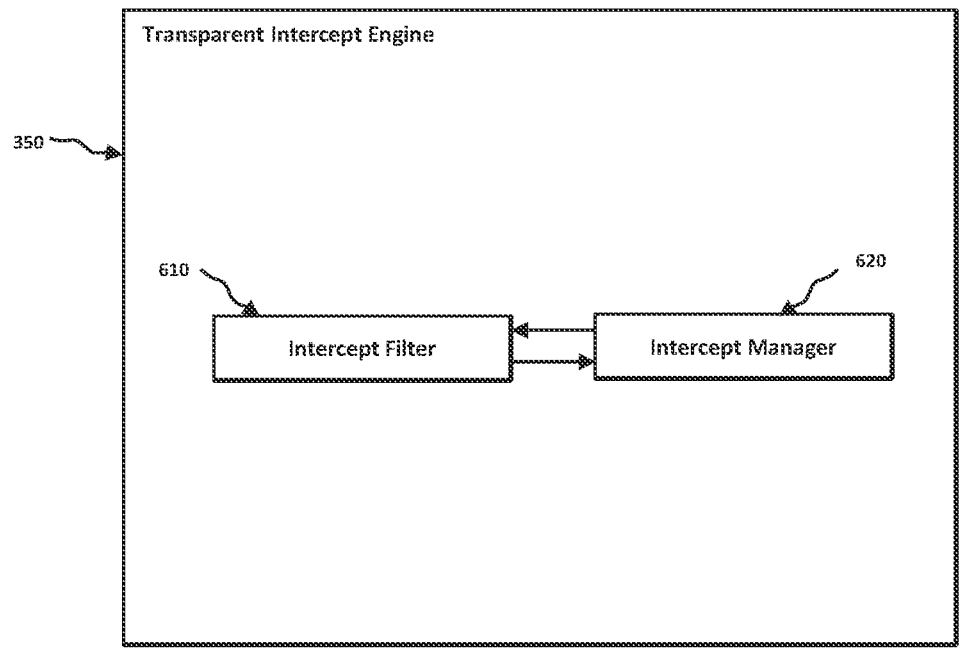
FIG. 6 shows components of a transparent intercept engine in accordance with an embodiment.

FIG. 6 shows components of a transparent intercept engine in accordance with an embodiment. Transparent intercept engine 350 includes an intercept filter 610 and an intercept manager 620. Intercept filter 610 is adapted to intercept communications in a communication path between upper layer and a storage device. For example, intercept filter 610 may intercept commands transmitted by upper layer to the storage device and/or acknowledgment messages returned by the storage device to the file system. Intercept filter 610 may intercept all communications in the communication path or may intercept only selected communications in the communication path. For example, intercept filter 610 may intercept only communications that meet one or more predetermined criteria, e.g., commands transmitted by upper layer, messages returned by the storage device, commands containing a WRITE command, commands containing a READ command, etc. Intercept filter 610 may include a command queue into which intercepted communications are placed prior to being analyzed and processed by intercept manager 620.

Intercept manager 620 is adapted to control the operation of intercept filter 610. For example, intercept manager 620 may from time to time provide an instruction to intercept filter 610 to intercept all communications transmitted in the communication path or commands satisfying a specified set of criteria. Intercept manager 620 may also perform one or more other operations with respect to communications that are intercepted by intercept filter 610. For example, intercept manager 620 may provide support for applications to perform caching, data backup, data deduplication, data mirroring, data migration, etc. Or other data storage-related activity with respect to communications intercepted by intercept filter 610.

Figure 7:
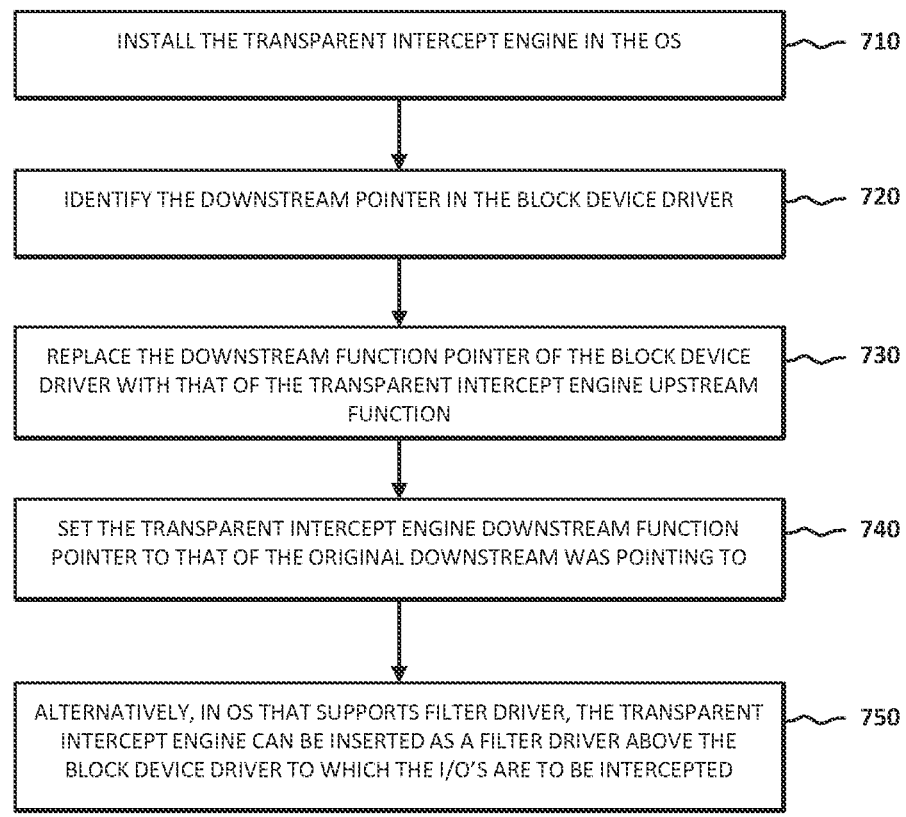
FIG. 7 is a flowchart of a method of adding a transparent intercept engine to a computer in accordance with an embodiment.

Advantageously, a transparent intercept engine may be installed on a computer without interrupting the computer's I/O operations. FIG. 7 is a flowchart of a method of adding a transparent intercept engine to a computer in accordance with an embodiment. For purposes of illustration, the method of FIG. 7 is discussed with reference to FIGS. 3, 4A, and 4B.

At step 710, the transparent intercept engine 350 is installed in the operating system of a computer. The process of installation is known.

At step 720, the downstream pointer in the block device driver is identified. The location of the function pointer of the block device driver 360 that is pointing to the associated to the downstream communication is identified, and the pointer is retrieved.

At step 730, the downstream function pointer of the block device driver is replaced with that of the transparent intercept engine upstream function. The pointer in the location of the pointer in the block device driver 360 is replaced with the function pointer of the transparent intercept engine.

At step 740, the transparent intercept engine downstream function pointer is set to that of the original downstream function pointer. The transparent intercept engine 350 is set to point to the associated downstream function originally in the block device driver 360.

At step 750, in an alternate procedure for OS that supports filter driver architecture, the transparent intercept engine 350 may be simply inserted between the upper layer and the block device driver 360 using OS-provided methods; therefore the pointer replacement does not need to be performed explicitly, as shown in FIG. 4B

After transparent intercept engine 350 has been installed in this manner, communications between file system 435 and storage device 480 are intercepted by transparent intercept engine 350. For example, a command transmitted by file system 435 to storage device 480 is first received by block device driver 360. The block device driver 360 will then transmit the command to transparent intercept engine 350. Transparent intercept engine 350 may perform one or more operations with respect to the command and then transmits the command to the associated downstream function, which eventually transmits the command to storage device 380.

Similarly, a command acknowledgement returned by storage device 380 to file system 435 is first received by transparent intercept engine 350. Transparent intercept engine returns the command acknowledgement to block device driver 360, which in turn returns the command acknowledgement to file system 335.

In accordance with an embodiment, intercept manager 620 of transparent intercept engine 350 uses a set of primitives to control intercept filter 610. Each primitive includes the following four elements:

(1) device information identifying a storage device; commands directed to the specified device are to be intercepted;

(2) command type information specifying a type of command that is to be intercepted;

(3) follow-up action information specifying one or more actions that are to be performed with respect to an intercepted command; and (4) default action information specifying an action that is to be performed with respect to an intercepted command if an interruption occurs in the communications between intercept filter 610 and intercept manager 620.

Accordingly, intercept manager 620 from time to time transmits to intercept filter 610 a primitive instructing intercept filter 610 to intercept commands satisfying specified criteria and to perform a specified action with respect to any intercepted commands. Intercept manager 620 may transmit primitives to intercept filter 610 in accordance with a predetermined policy, for example.

Figure 8:
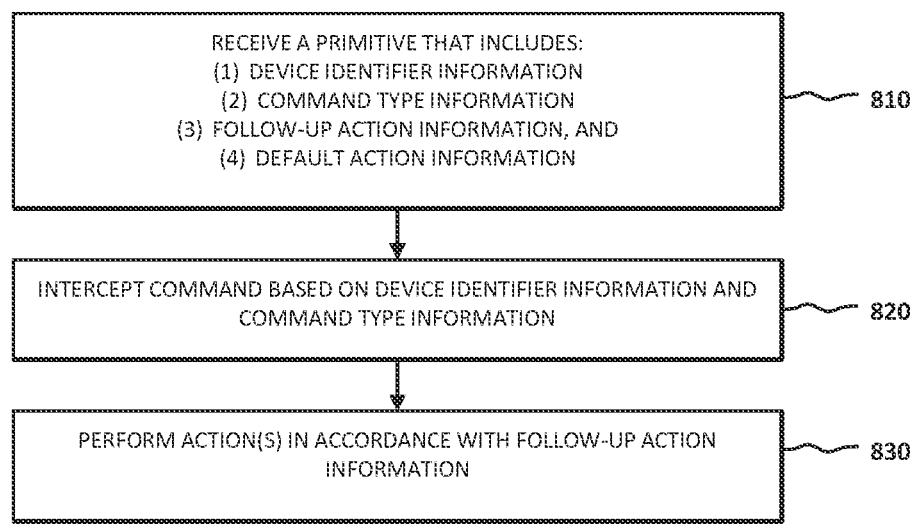
FIG. 8 is a flowchart of a method in accordance with an embodiment.

FIG. 8 is a flowchart of a method in accordance with an embodiment. At step 810, a primitive is received that includes (1) device identifier information, (2) command type information, (3) follow-up action information, and (4) default action information. In the illustrative embodiment, intercept filter 610 receives a primitive that specifies a device for which commands are to be intercepted, a type of command that is to be intercepted, one or more actions that are to be performed with respect to any intercepted commands, and one or more actions that are to be performed with respect to intercepted commands if communications with intercept manager 620 are interrupted.

At step 820, a command is intercepted based on the device information and the command type information. Intercept filter 620 intercepts a command satisfying the criteria specified in the primitive.

At step 830, an action is performed in accordance with the follow-up action information. Intercept filter 610 performs the follow-up action specified in the primitive.

In accordance with an embodiment, the command type information in a primitive may specify one the following three types:

(1) Data-Read—this command type information specifies that commands to read data from the storage device are to be intercepted.

(2) Data-Write—this command type information specifies that commands to write data onto the storage device are to be intercepted.

(3) Other—this command type information specifies that all other commands (other than Data-Read and Data-Write) are to be intercepted.

In accordance with an embodiment, the follow-up action information in a primitive may include one of the following:

(1) Down-Wait—This follow-up action instructs the intercept filter (after a command transmitted by the upper layer such as file system is intercepted) to wait for further instructions until the intercept manager is notified.

(2) Down-Continue—This follow-up action instructs the intercept filter (after a command transmitted by the upper layer such as file system is intercepted) to continue to execute the command as usual after the intercept filter is notified.

(3) Up-Check—This follow-up action instructs the intercept filter (after a command acknowledgement returned by the storage device is intercepted) to verify completion of a particular action specified by the intercept manager (for example, verifying that data in a corresponding WRITE command transmitted previously by the file system has been successfully backed up).

(4) Up-Wait—This follow-up action instructs the intercept filter (after a command acknowledgement returned by the storage device is intercepted) to wait for further instructions from the intercept manager.

FIGS. 9-12 are flowcharts illustrating the operation of various follow-up actions. For purposes of illustration, FIGS. 9-12 are discussed with reference to FIGS. 3 and 6.

Figure 9:
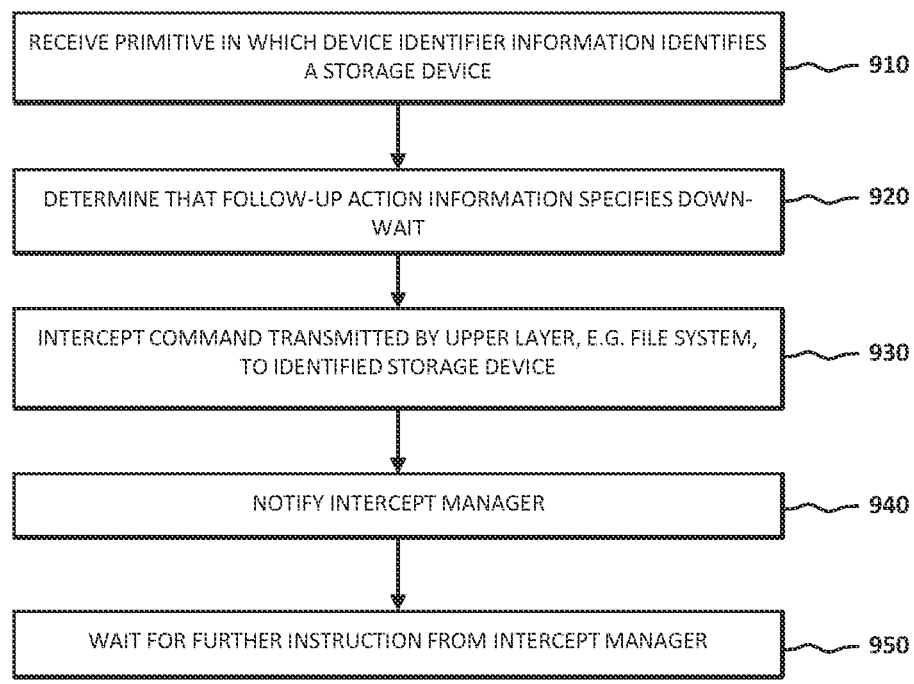
FIG. 9 is a flowchart of a method of intercepting a command and performing a Down-Wait follow-up action in accordance with an embodiment.

FIG. 9 is a flowchart of a method of intercepting a command and performing a Down-Wait follow-up action in accordance with an embodiment. At step 910, a primitive is received in which the device identifier information identifies a storage device. In the illustrative embodiment, intercept filter 610 receives a primitive in which the device information identifies storage device 380, indicating that commands directed to storage device 380 (and messages from storage device 380) are to be intercepted. At step 920, a determination is made that the follow-up action in the primitive specifies Down-Wait. Intercept filter 610 examines the primitive and determines that the follow-up action specified in the primitive specifies Down-Wait. At step 930, a command transmitted by the file system to the identified storage device is intercepted. Intercept filter 610 intercepts a command transmitted by file system 335 to storage device 380. At step 940, the intercept manager is notified. Intercept filter 610 notifies intercept manager 620. At step 950, the intercept filter waits for further instructions. Thus, intercept filter 610 waits for further instructions from intercept manager 620.

Figure 10:
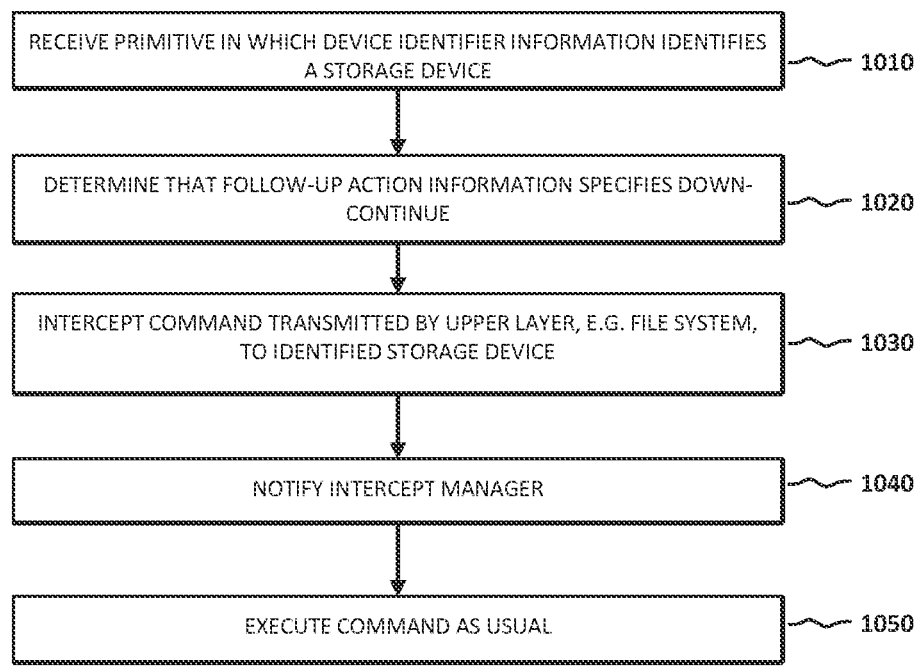
FIG. 10 is a flowchart of a method of intercepting a command and performing a Down-Continue follow-up action in accordance with an embodiment.

As set forth in FIG. 9, if the follow-up action of a primitive specifies Down-Wait, after intercept filter 610 notifies intercept manager 620, intercept filter 610 waits for further instructions. The instruction generated by Intercept manager 620 may be one of the following instructions:

(1) Set Command Ready—set the command status in the command queue to Ready for Return
(2) Get Data from Command Buffer and Continue—Copy the data from the command buffer to a provided buffer then allow the command to continue
(3) Get Data from Command Buffer and Wait—Copy the data from the command buffer to a provided buffer, then wait for the next instruction
(4) Put Data to Command Buffer and Complete Command—Copy the data from a provided buffer to the command buffer and complete the command
(5) Put Data to Command Buffer and Wait—Copy the data from a provided buffer to the command buffer and wait for the next instruction
(6) Complete Command—Complete the command by returning to intercept manager with specified status
(7) Continue—Allow the command to continue along the path to the storage device
(8) Wait—Wait for the next instruction FIG. 10 is a flowchart of a method of intercepting a command and performing a Down-Continue follow-up action in accordance with an embodiment. At step 1010, a primitive is received in which the device identifier information identifies a storage device. Intercept filter 610 receives a primitive in which the device information identifies storage device 580, indicating that commands directed to storage device 580 (and messages from storage device 580) are to be intercepted. At step 1020, a determination is made that the follow-up action in the primitive specifies Down-Continue. Intercept filter 610 examines the primitive and determines that the follow-up action specified in the primitive specifies Down-Continue. At step 1030, a command transmitted by the file system to the storage device is intercepted. Intercept filter 610 intercepts a command transmitted by file system 535 to storage device 580. At step 1040, the intercept manager is notified. Intercept filter 610 informs intercept manager 620. At step 1050, the command is executed as usual. Intercept filter 610 executes the command as usual. For example, after informing intercept manager 620, intercept filter 610 may transmit the command to Driver 2 (560-2), allowing the command to continue along the intended path.

Figure 11:
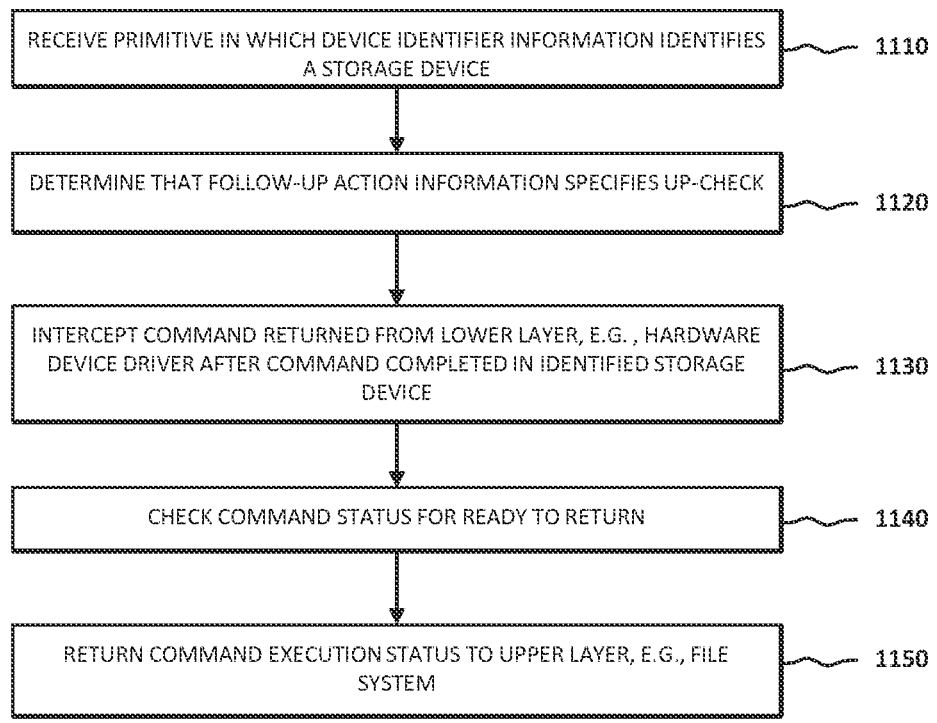
FIG. 11 is a flowchart of a method of intercepting a command and performing an Up-Check follow-up action in accordance with an embodiment.

FIG. 11 is a flowchart of a method of intercepting a command and performing an Up-Check follow-up action in accordance with an embodiment. At step 1110, a primitive is received in which the device information identifies a storage device. In the illustrative embodiment, intercept filter 610 receives a primitive in which the device information identifies storage device 380. At step 1120, a determination is made that the follow-up action information specifies Up-Check. Intercept filter 610 examines the primitive and determines that the follow-up action information in the primitive specifies Up-Check. At step 1130, a command acknowledgement returned from the lower layer (e.g., hardware device driver) after the command has been completed in the identified storage device is intercepted. Intercept filter 610 intercepts a command acknowledgement returned from the storage device to the file system. For example, an acknowledgment of a WRITE command acknowledgement returned by storage device 380 to file system 335 may be intercepted. At step 1140, a check command status for ready to return is performed. A verification that an operation by the intercept manager has been completed therefore the ready status is set. Intercept filter 610 verifies that an action previously specified by intercept manager 620 has been completed. For example, in connection with a data backup operation, intercept filter 610 may verify that the data in the original command has been copied and stored, before returning the command acknowledgement to file system 335 at step 1150. At step 1150, command execution status is returned to the upper layer (e.g., file system). Intercept manager 620 notifies the upper layer of the command execution status.

Figure 12:
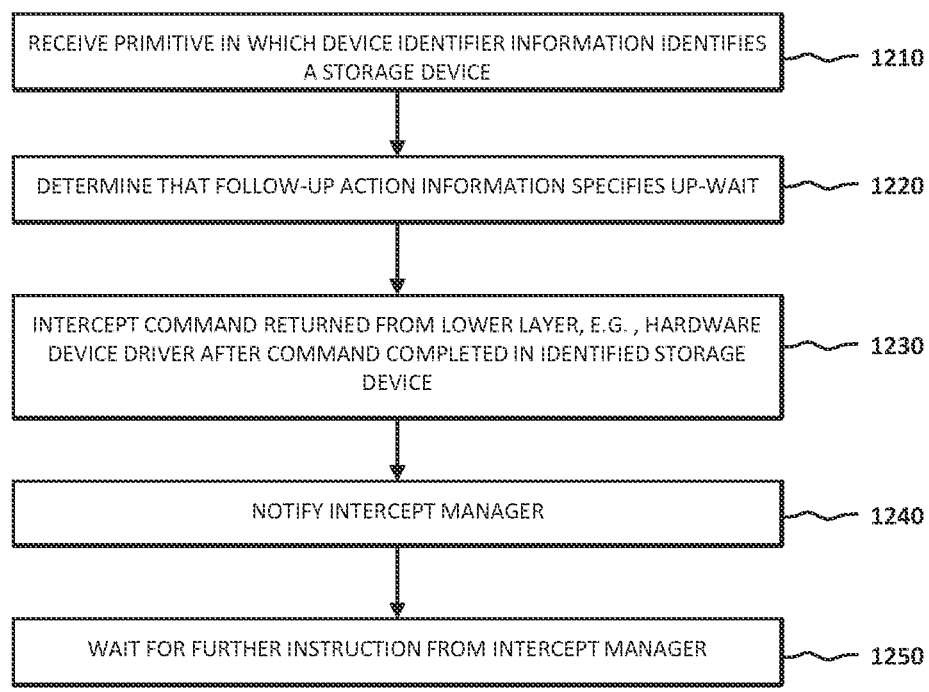
FIG. 12 is a flowchart of a method of intercepting a command and performing an Up-Wait follow-up action in accordance with an embodiment.

FIG. 12 is a flowchart of a method of intercepting a command and performing an Up-Check follow-up action in accordance with an embodiment. At step 1210, a primitive is received in which the device information identifies a storage device. In the illustrative embodiment, intercept filter 610 receives a primitive in which the device information identifies storage device 380. At step 1220, a determination is made that the follow-up action information specifies Up-Wait. Intercept filter 610 examines the primitive and determines that the follow-up action information in the primitive specifies Up-Wait. At step 1230, a command returned from the lower layer (e.g., hardware device driver after the command is completed in the identified storage device). In one embodiment, intercept filter 610 intercepts a command acknowledgement returned from the storage device to the file system. For example, an acknowledgment of a WRITE command acknowledgement returned by storage device 380 to file system 335 may be intercepted. At step 1240, the intercept manager is notified. Intercept filter 610 informs intercept manager 620. At step 1250, the intercept filter waits for further instruction from the intercept manager. Thus, intercept filter 610 waits for further instruction from intercept manager 620.

Figure 13:
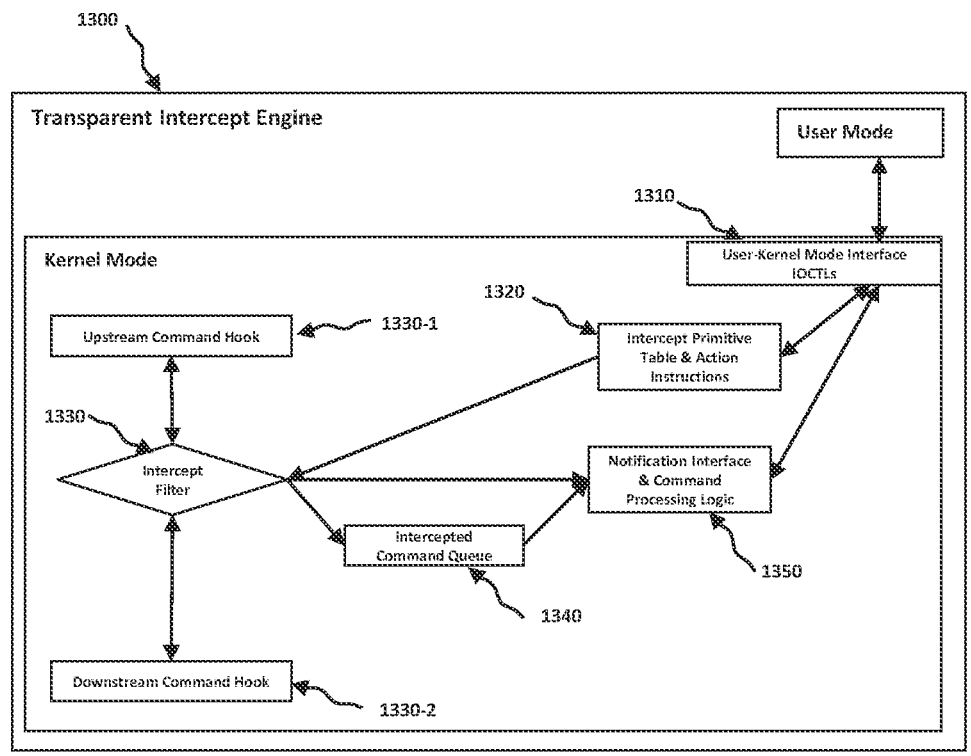
FIG. 13 shows components of a transparent intercept engine in accordance with another embodiment.

FIG. 13 shows components of a transparent intercept engine in accordance with another embodiment. Transparent intercept engine 1300 includes a User-Kernel Mode Interface 1310, an Intercept Primitive Table & Action Instructions 1320, an Intercept Filter 1330, with 1330-1 being the upstream command hook, and 1330-2 being the downstream command hook for intercept filter 1330, a Command Queue 1340, a Notification Interface & Command Processing Logic 1350.

User-Kernel Mode Interface 1310 is implemented by a set of input/output controls (IOCTLs) supported by the operating system of the processing device.

Intercept Primitive Table & Action Instructions 1320 enables the provision of specific and precise instructions with respect to the type of command, direction of input/output to be intercepted, and specific primitive operation(s) to be performed.

Intercept Filter 1330, with the upstream command hook 1330-1 and the downstream command hook 1330-2 perform the intercept of a command performs operations on the intercepted command, based on the rules and criteria provided in the instruction set, which is determined by the specific dynamic instructions from the upper layer virtualization logic.

Command Queue 1340 tracks the intercepted commands and maintains the processing status for subsequently dispatching the commands.

Notification Interface & Command Processing Logic 1350 notifies the upper layer when a command meeting the specified criteria is intercepted and placed in the Command Queue 1340.

Autonomous Mode & Ephemeral Changed Data Map

In accordance with an embodiment, there are at least three scenarios in which the intercept filter may lose communication with the intercept manager, triggering the autonomous mode:

1. The intercept filter is notified that the intercept manager daemon is being unloaded.
2. During start-up, the intercept manger daemon has not yet connected.
3. The intercept manager daemon is incapacitated, e.g., hung, that it exceeded the timeout for picking up the intercepted commands.

When any of these scenarios occur, the intercept filter begins operating in autonomous mode. In autonomous mode, the intercept filter assumes the responsibility to act in accordance with the default action specified in the primitive. The default action may be one of the following two actions:

1. Reject—I/O commands are to be failed when the intercept filter is in autonomous mode. All commands through the intercept filter are terminated and rejected with error as "Device Not Ready".
2. Track—The intercept filter uses the temporary (ephemeral) map to track the data-out commands for their locations. The commands will be allowed through and to be completed normally.

For the "Track" option when the intercept filter is in autonomous mode, the intercept filter uses the ephemeral map to track the locations of the changed data. The ephemeral map is allocated in memory only and it is volatile. It is meant to only exist for the following logic is to support the scheme:

1. Set a persistent "Dirty" indicator for the disk in persistent storage.
2. Record the location of the writes in the changed data map in memory only.
3. Only when the above is completed are the write commands allowed through.

Operational Flow

In accordance with an embodiment, the flow of the operation of the transparent intercept engine when deployed on a computer is as follows:

1. An input/output (I/O) operation is performed by an application on the file system.
2. An I/O command is created by the file system to perform the operation on the designated storage device.
3. The command travels down to the block device interface in the computer operating system.
4. The transparent intercept engine, when deployed, is registered with a set of instructions (primitives).
5. Each primitive contains the following elements:
   Device
   Command Type
   Follow-Up Action
   Default Action
6. Subsequently, when the intercept filter receives a command, if the command is directed to the device specified in the primitive and is of the type specified in the primitive, the command is intercepted and placed in the Command Queue.
7. After a command is intercepted, the intercept manager is notified; the notification specifies the command type, the location of the I/O to be performed, and the data pointer to the buffer of the command data, if any.
8. In accordance with the Follow-Up Action specified in the primitive, the command may continue going down the downstream path and be executed on the device, or it may wait for further instruction from the intercept manager.
9. The Follow-Up Action specified in the primitive may be any one of a range of operations. The Follow-Up Action may include but not limited to one of the following:
   Terminate the command due to error.
   Fill the command buffer with data and complete the command.
   Instruct the command to continue downstream to be executed on the storage device.
   Set the status of the command to direct its operation when it returns from execution on the storage device.
   Obtain the data of the command for further processing.
10. If the instruction received is not to terminate the command, the command is to continue going down to the downstream and to be executed on the device.
11. When the command has completed execution on the disk, the status and/or the data is returned.
12. Depending on the intercept criteria, the intercept filter may check the status then complete the command, or it may have to wait for further instructions from the intercept manager before it can complete the command.

Example: Adding New Functionality (Data Migration)

In accordance with an embodiment, a transparent intercept engine advantageously enables a user to transparently intercept data storage-related communications between a file system and storage device of a processing device and transparently perform one or more additional data-storage related operations with respect to data stored in the storage device.

Figure 14:
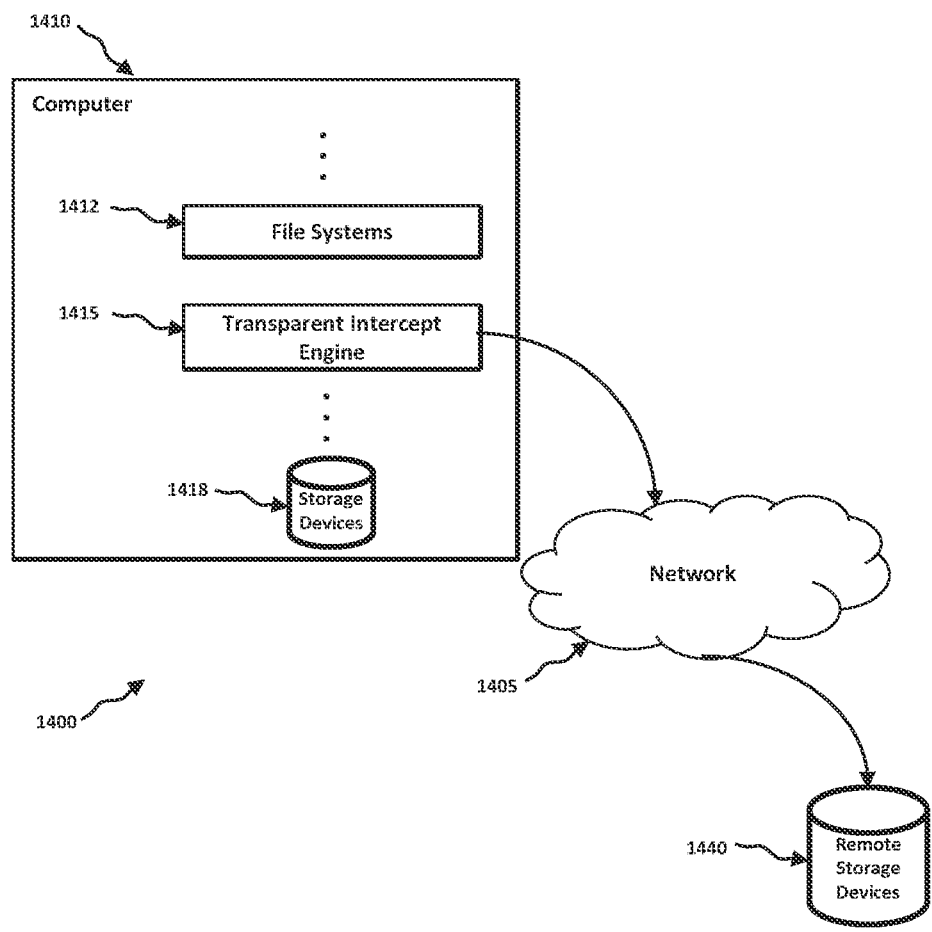
FIG. 14 shows a communication system in accordance with an embodiment.

FIG. 14 shows a communication system in accordance with an embodiment. Communication system 1400 includes a computer 1410, a network 1405, and a remote storage device 1440.

Computer 1410 includes a file system 1412 and a storage device 1418. Computer 1410 also includes a transparent intercept engine 1415 that transparently intercepts selected commands transmitted between file system 1412 and storage device 1418.

Advantageously, transparent intercept engine 1415 may perform, in a transparent manner, additional data storage-related operations with respect to data stored in storage device 1418. For example, transparent intercept engine 1415 may intercept WRITE commands transmitted by file system 1412 to storage device 1418, extract the data from the WRITE commands, and back up the data on remote storage device 1440. Other data storage-related operations may be performed with respect to data contained in various commands. For example, transparent intercept engine 1415 may perform caching, data backup, data deduplication, data mirroring, data migration, etc.

Figure 15A:
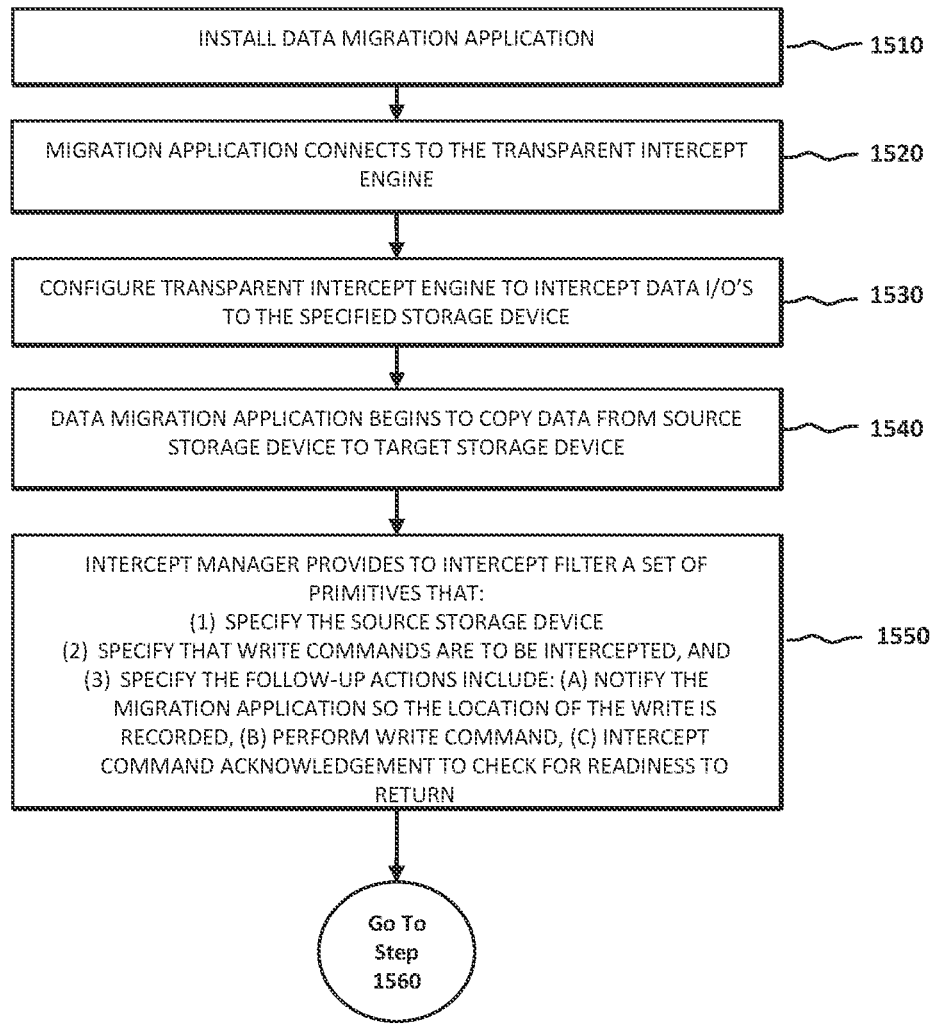
FIGS. 15A-15B include a flowchart of a method of performing a data migration operation in accordance with an embodiment.
Figure 15B:
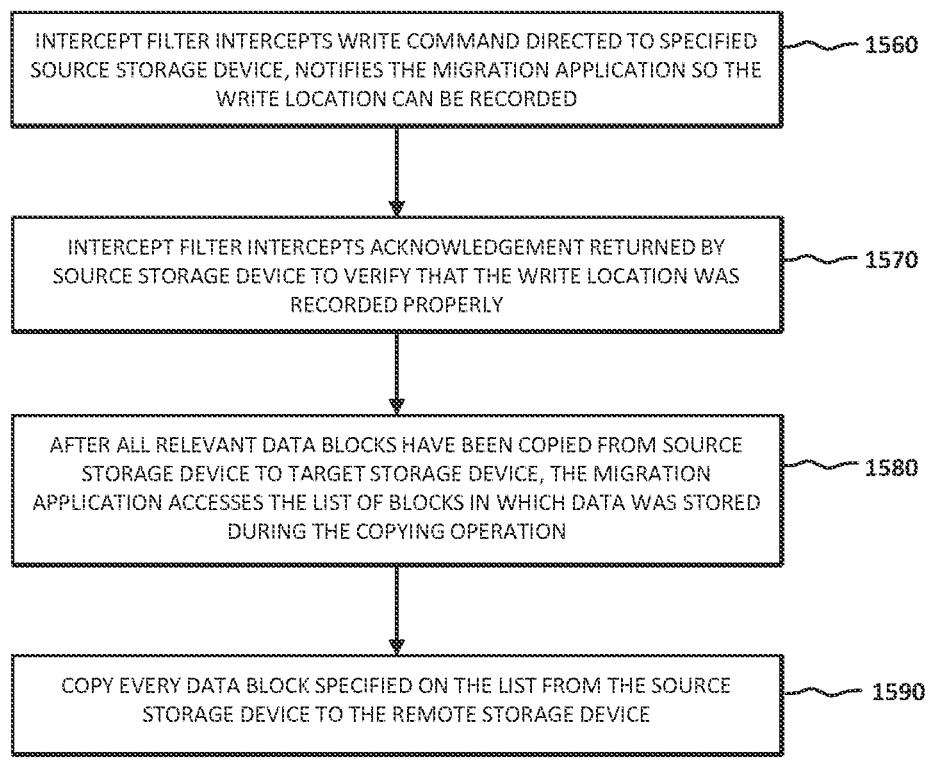

For example, in accordance with an embodiment, a transparent intercept engine may be used to facilitate a data migration operation. FIG. 15 is a flowchart of a method of performing a data migration operation in accordance with an embodiment. The method of FIG. 15 is discussed with reference to FIGS. 3, 6, and 14.

In an illustrative embodiment, a data migration operation is to be performed in order to migrate selected data from storage device 380 of computer 310 to remote storage device 1440 (shown in FIG. 14). For example, one or more files, or one or more volumes, of data may be migrated. Alternatively, all data stored on storage device 380 may be migrated to remote storage device 1440.

Figure 16:
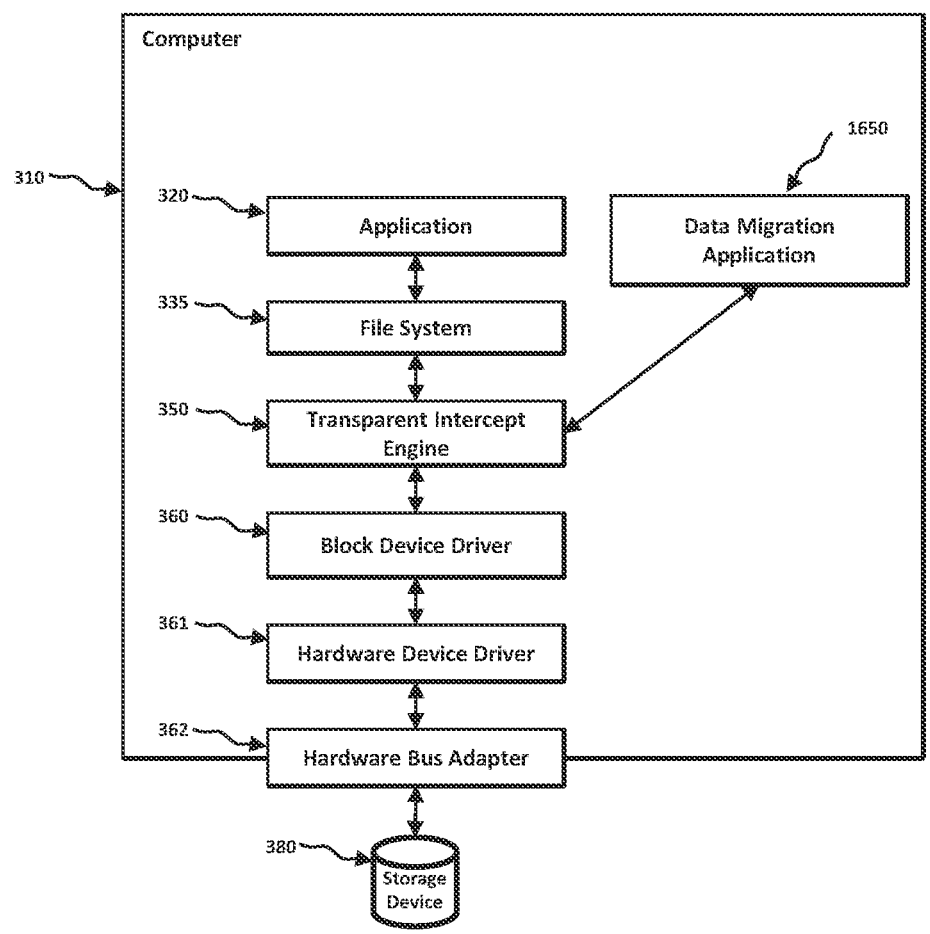
FIG. 16 shows a computer in accordance with an embodiment.

At step 1510, a data migration application is installed on the computer. FIG. 16 shows computer 310 in accordance with an embodiment. Data migration application 1650 has been installed on computer 310.

At step 1520, the migration application connects to the transparent intercept engine. In the illustrative embodiment, transparent intercept engine 350 has been installed on computer 310 in the manner described herein. Migration application 1650 connects to transparent intercept engine 350.

At step 1530, the transparent intercept engine is configured to intercept data IOs (input/output) to the specified storage device. Pointer within block device driver 360 is replaced with pointer associated with intercept filter 610 (as described at steps 730 and 740 of FIG. 7).

At step 1540, the data migration application begins to copy data from the source storage device to the target storage device. Data migration application 1650 begins to copy data from storage device 380 to remote storage device 1440. Because both storage device 380 and remote storage device 1440 are block-level devices, one or more blocks associated with the selected data are copied. For example, supposing that a volume of data storage on storage device 380 is to be migrated, one or more blocks associated with the volume of data may be copied.

At step 1550, the intercept manager provides to the intercept filter a set of primitives that (1) specify the source storage device, (2) specify that WRITE commands are to be intercepted, and (3) specify that the follow-up actions include: notify the migration application so that the WRITE location is recorded, perform the WRITE command and intercept the command acknowledgment to check for readiness to return.

At step 1560, the intercept filter intercepts WRITE commands directed to the specified source storage device, and notifies the migration application so that the WRITE location can be recorded. Thus, in accordance with the set of primitives, intercept filter 610 begins to intercept WRITE commands directed to storage device 580. Intercept filter 610 sends a notification to the migration application to record the WRITE location, transmits the WRITE command to downstream In one embodiment, an identifier of the block where data is written is recorded by the migration application. In this manner, a changed data map containing a list of each block where data is recorded by the migration application while the migration application performs the copy operation is generated.

At step 1570, the intercept filter intercepts an acknowledgment message returned by the source storage device verifying that the WRITE command has been performed, and verifies that storage location was correctly recorded by the migration application. In the illustrative embodiment, after storage device 380 executes the WRITE command, storage device 380 returns an acknowledgment message to file system 535. Intercept filter 610 intercepts the message and verifies that the location of the data written has been correctly recorded by the migration application. If the location has been recorded successfully, intercept filter 610 returns the acknowledgement message to file system 335. If the location has not yet been recorded, intercept filter 610 waits until it receives confirmation that the recording has been completed.

At step 1580, after the relevant data blocks have been copied from the source storage device to the target storage device, the migration application accesses the list of storage locations where data was written during the copying operation. In the illustrative embodiment, after migration application 1650 copies all of the relevant blocks of data from storage device 380 to remote storage device 1440, migration application 1650 accesses the changed data map containing the list of blocks where data was written during the copying operation.

At step 1590, every data block specified on the list is copied from the source storage device to the target storage device. In order to ensure that remote storage device 1440 contains an accurate, up-to-date, copy of the data on storage device 380, migration application 1650 copies every block recorded on the list from storage device 380 to remote storage device 1440.

Advantageously, transparent intercept engine 350 thus enables the migration application to copy data from the source storage device to the target storage device while the source storage device is still active and without disruption to the source storage device's operations.

In various embodiments, the method steps described herein, including the method steps described in FIGS. 7, 8, 9, 10, 11, 12, and/or 15A-15B may be performed in an order different from the particular order described or shown. In other embodiments, other steps may be provided, or steps may be eliminated, from the described methods.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc., internal or external to the computer chassis, or from the network, such as fibre channel or iSCSI.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIGS. 7, 8, 9, 10, 11, 12, and/or 15A-15B may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 17:
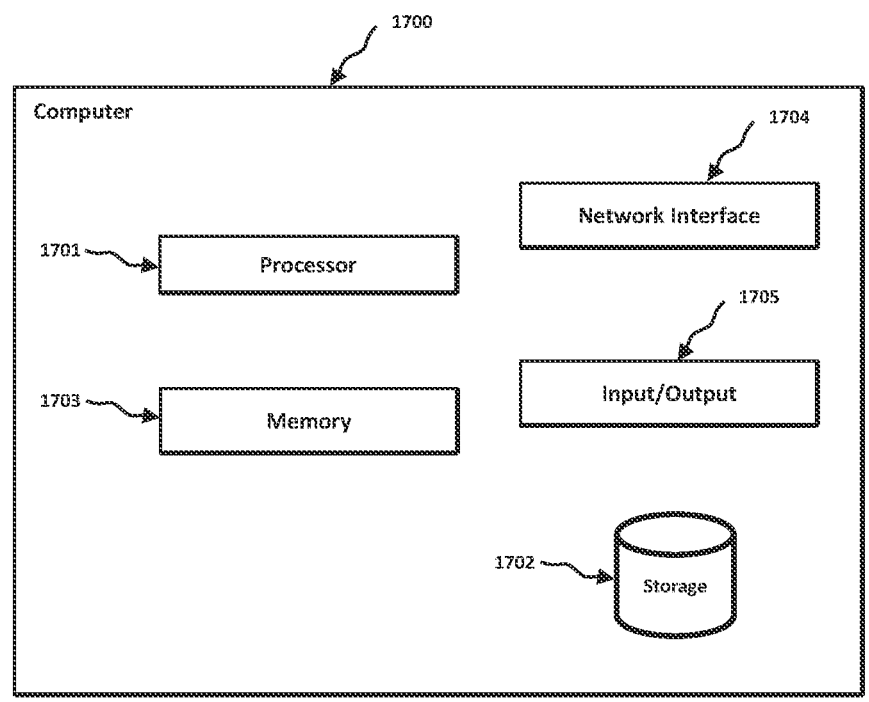
FIG. 17 shows components of an exemplary computer.

A high-level block diagram of an exemplary computer that may be used to implement systems, apparatus and methods described herein is illustrated in FIG. 17. Computer 1700 includes a processor 1701 operatively coupled to a data storage device 1702 and a memory 1703. Processor 1701 controls the overall operation of computer 1700 by executing computer program instructions that define such operations. The computer program instructions may be stored in data storage device 1702, or other computer readable medium, and loaded into memory 1703 when execution of the computer program instructions is desired. Thus, the method steps of FIGS. 7, 8, 9, 10, 11, 12, and/or 15A-15B can be defined by the computer program instructions stored in memory 1703 and/or data storage device 1702 and controlled by the processor 1701 executing the computer program instructions. For example, the computer program instructions can be implemented as computer executable code programmed by one skilled in the art to perform an algorithm defined by the method steps of FIGS. 7, 8, 9, 10, 11, 12, and/or 15A-15B. Accordingly, by executing the computer program instructions, the processor 1701 executes an algorithm defined by the method steps of FIGS. 7, 8, 9, 10, 11, 12, and/or 15A-15B. Computer 1700 also includes one or more network interfaces 1704 for communicating with other devices via a network. Computer 1700 also includes one or more input/output devices 1705 that enable user interaction with computer 1700 (e.g., display, keyboard, mouse, speakers, buttons, etc.).

Processor 1701 may include both general and special purpose microprocessors, and may be the sole processor or one of multiple processors of computer 1700. Processor 1701 may include one or more central processing units (CPUs), for example. Processor 1701, data storage device 1702, and/or memory 1703 may include, be supplemented by, or incorporated in, one or more application-specific integrated circuits (ASICs) and/or one or more field programmable gate arrays (FPGAs).

Data storage device 1702 and memory 1703 each include a tangible non-transitory computer readable storage medium. Data storage device 1702, and memory 1703, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 1705 may include peripherals, such as a printer, scanner, display screen, etc. For example, input/output devices 1705 may include a display device such as a cathode ray tube (CRT) or liquid crystal display (LCD) monitor for displaying information to the user, a keyboard, and a pointing device such as a mouse or a trackball by which the user can provide input to computer 1700.

Any or all of the systems and apparatus discussed herein, including components thereof, may be implemented using a computer such as computer 1700.

One skilled in the art will recognize that an implementation of an actual computer or computer system may have other structures and may contain other components as well, and that FIG. 17 is a high-level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. An intercept engine comprising:
    an intercept filter adapted to intercept selected commands transmitted between a file system and a storage device; and
    an intercept manager adapted to transmit to the intercept filter one or more primitives, each primitive comprising:
        device information specifying a device, wherein a command directed to the specified device is to be intercepted;
        command type information specifying a type of command to be intercepted; and
        follow-up action information specifying an action to be performed after the command has been intercepted;
    wherein the primitive further comprises:
        default action information specifying an action to be performed with respect to the command if a communication between the intercept filter and the intercept manager is interrupted.

2. The intercept engine of claim 1, wherein the intercept engine and the file system reside and operate in a single computer.

3. The intercept engine of claim 2, wherein the storage device is linked to the computer.

4. The intercept engine of claim 1, wherein the command type information specifies one of: a read command and a write command.

5. An intercept engine comprising:
  an intercept filter adapted to intercept selected commands transmitted between a file system and a storage device; and
  an intercept manager adapted to transmit to the intercept filter one or more primitives, each primitive comprising:
    device information specifying a device, wherein a command directed to the specified device is to be intercepted;
    command type information specifying a type of command to be intercepted; and
    follow-up action information specifying an action to be performed after the command has been intercepted;
  wherein the follow-up action includes an instruction to perform one of the following actions:
  with respect to a command transmitted from the file system to the storage device, hold the command and wait until further instruction is received from the intercept manager;
  with respect to a command transmitted from the file system to the storage device, notify the intercept manager and execute the command;
  with respect to a command transmitted from the storage device to the file system, hold the command until confirmation that the command has been performed is received from the intercept manager; and
  with respect to a command transmitted from the storage device to the file system, hold the command and wait until further instruction is received from the intercept manager.

6. A method comprising:
  installing the intercept engine of claim 1 on a computer;
  installing on the computer an application adapted to migrate selected data stored the storage device to a second storage device;
  copying, by the application, one or more first data blocks associated with the selected data, from the storage device to the second storage device;
  intercepting, by the intercept engine, write commands transmitted between a file system of the computer and the storage device;
  for each write command intercepted:
    allowing, by the intercept engine, the write command to be executed on the storage device; and
    recording, by the intercept engine, in a changed data map, a location of the data stored;
  copying, by the application, one or more second data blocks from the storage device to the second storage device, based on the changed data map.

7. A device comprising:
  a storage device adapted to store data;
  a file system adapted to store data in the storage device;
  an intercept filter adapted to intercept selected commands transmitted between the file system and the storage device; and
  an intercept manager adapted to transmit to the intercept filter one or more primitives, each primitive comprising:
    device information specifying a device, wherein a command directed to the specified device is to be intercepted;
    command type information specifying a type of command to be intercepted; and
    follow-up action information specifying an action to be performed after the command has been intercepted;
  wherein the primitive further comprises:
    default action information specifying an action to be performed with respect to the command if a communication between the intercept filter and the intercept manager is interrupted.

8. The device of claim 7, wherein the command type information specifies one of: a read command and a write command.

9. A device comprising:
  a storage device adapted to store data;
  a file system adapted to store data in the storage device;
  an intercept filter adapted to intercept selected commands transmitted between the file system and the storage device; and
  an intercept manager adapted to transmit to the intercept filter one or more primitives, each primitive comprising:
    device information specifying a device, wherein a command directed to the specified device is to be intercepted;
    command type information specifying a type of command to be intercepted; and
    follow-up action information specifying an action to be performed after the command has been intercepted;
  wherein the follow-up action includes an instruction to perform one of the following actions:
  with respect to a command transmitted from the file system to the storage device, hold the command and wait until further instruction is received from the intercept manager;
  with respect to a command transmitted from the file system to the storage device, notify the intercept manager and execute the command;
  with respect to a command transmitted from the storage device to the file system, hold the command until confirmation that the command has been performed is received from the intercept manager; and
  with respect to a command transmitted from the storage with respect to a command transmitted from the storage device to the file system, hold the command and wait until further instruction is received from the intercept manager.

10. The intercept engine of claim 5, wherein the intercept engine and the file system reside and operate in a single computer.

11. The intercept engine of claim 10, wherein the storage device is linked to the computer.

12. The intercept engine of claim 5, wherein the command type information specifies one of: a read command and a write command.

13. A method comprising: installing the intercept engine of claim 5 on a computer; installing on the computer an application adapted to migrate selected data stored in the storage device to a second storage device; copying, by the application, one or more first data blocks associated with the selected data, from the storage device to the second storage device; intercepting, by the intercept engine, write commands transmitted between a file system of the computer and the storage device; for each write command intercepted: allowing, by the intercept engine, the write command to be executed on the storage device; and recording, by the intercept engine, in a changed data map, a location of the data stored; copying, by the application, one or more second data blocks from the storage device to the second storage device, based on the changed data map.

14. The device of claim 7, wherein the command type information specifies one of: a read command and a write command.

15. The device of claim 9, wherein the command type information specifies one of: a read command and a write command.

* * * * *